US012421866B2

(12) United States Patent
Warren

(10) Patent No.: US 12,421,866 B2
(45) Date of Patent: Sep. 23, 2025

(54) ANTI-ROTATION FEATURE FOR INSTRUMENTATION OF GAS TURBINE ENGINE

(71) Applicant: RTX Corporation, Farmington, CT (US)

(72) Inventor: Eli Warren, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/468,297

(22) Filed: Sep. 15, 2023

(65) Prior Publication Data

US 2025/0092798 A1 Mar. 20, 2025

(51) Int. Cl.
*F01D 21/00* (2006.01)

(52) U.S. Cl.
CPC ........ *F01D 21/003* (2013.01); *F05D 2230/60* (2013.01); *F05D 2260/31* (2013.01); *F05D 2270/80* (2013.01)

(58) Field of Classification Search
CPC ....... F01D 21/003; F16B 39/34; F16B 39/025
USPC .......................................................... 411/113
See application file for complete search history.

(56) References Cited

U.S. PATENT DOCUMENTS 3,335,598 A 8/1967 Jessen
4,018,083 A * 4/1977 Hoffman ................ G01H 1/003 73/660
4,105,058 A 8/1978 Bunn et al.
8,922,203 B2 * 12/2014 Wickstead ............. G01B 21/16 324/207.13
9,316,479 B2 * 4/2016 Warren .................... G01B 7/22
10,598,208 B2 * 3/2020 Mai ........................ B21D 17/02
10,641,596 B2 * 5/2020 Warren ................... F01D 17/02
2010/0143031 A1 * 6/2010 Chamberlin .......... F16C 35/067 403/409.1
2013/0181699 A1 * 7/2013 Wickstead ............. G01B 21/16 324/207.16

(Continued)

FOREIGN PATENT DOCUMENTS

CN 102767556 A 11/2012

OTHER PUBLICATIONS

Extended European Search Report for EP Application No. 24188683.7, dated Dec. 2, 2024, pp. 1-12.

*Primary Examiner* — Eldon T Brockman
(74) *Attorney, Agent, or Firm* — CANTOR COLBURN LLP

(57) ABSTRACT

A component assembly of a gas turbine engine includes a component of a gas turbine engine, and an instrumentation probe installed to the component. The instrumentation probe includes a sensor body extending through a component wall, and a threaded fastener installed onto a complimentary thread of the sensor body to retain the sensor body. The threaded fastener is retained to the sensor body via deforming a threaded interface between the threaded fastener and the sensor body. A method of installing an instrumentation probe to a component of a gas turbine engine includes installing a sensor assembly of the instrumentation probe through a component wall, securing a threaded fastener to a complimentary thread of the sensor assembly to retain the sensor body, and deforming a threaded interface between the threaded fastener and the sensor assembly to prevent rotation of the threaded fastener relative to the sensor assembly.

19 Claims, 5 Drawing Sheets

(56) References Cited

U.S. PATENT DOCUMENTS

| | | | | |
|---|---|---|---|---|
| 2014/0076037 | A1* | 3/2014 | Warren | G01B 7/22<br>73/112.01 |
| 2016/0061638 | A1 | 3/2016 | Schleif et al. | |
| 2016/0265381 | A1 | 9/2016 | Vo et al. | |
| 2018/0328398 | A1* | 11/2018 | Mai | B21D 17/02 |
| 2019/0383594 | A1* | 12/2019 | Warren | F01D 17/02 |

* cited by examiner

ANTI-ROTATION FEATURE FOR INSTRUMENTATION OF GAS TURBINE ENGINE

STATEMENT OF FEDERAL SUPPORT

This invention was made with Government support awarded by the United States. The Government has certain rights in this invention.

BACKGROUND

Exemplary embodiments of the present disclosure pertain to the art of gas turbine engines, and more particularly to data collection during operation of a gas turbine engine.

Testing of operation of gas turbine engines requires the collection of data regarding various components and locations on the gas turbine engine. This data collection often includes the measurement of clearances between components during operation of the gas turbine engine, or other features. The data is typically gathered via probes or other sensors arrayed about the engine and secured to rotationally fixed components of the engine. Many such sensors are secured in place by a threaded connection to the fixed structure, and it is desired to rotationally secure the sensors in place thus preventing their movement or "backing out" during operation of the engine. Further, the sensors may have brittle or otherwise delicate components, so the rotational securing must be accomplished without damaging the sensor.

One such location for the measurement of clearances is radial proximity between stator segments and a rotating hub.

BRIEF DESCRIPTION

In one exemplary embodiment, a component assembly of a gas turbine engine includes a component of a gas turbine engine, and an instrumentation probe installed to the component. The instrumentation probe includes a sensor body extending through a component wall of the component, and a threaded fastener installed onto a complimentary thread of the sensor body to retain the sensor body at the component. The threaded fastener is retained to the sensor body via deforming a threaded interface between the threaded fastener and the sensor body.

Additionally or alternatively, in this or other embodiments the deformation is formed via application of a vibra-stake tool to the threaded interface.

Additionally or alternatively, in this or other embodiments the deforming is at one or more of the threaded fastener and the sensor body.

Additionally or alternatively, in this or other embodiments the threaded fastener is a nut.

Additionally or alternatively, in this or other embodiments a probe housing at least partially encloses the sensor body and the threaded fastener.

Additionally or alternatively, in this or other embodiments a probe lead is operably connected to the sensor body and extends through a lead opening in the probe housing.

Additionally or alternatively, in this or other embodiments the deformation is at one or more circumferential locations of the threaded interface.

Additionally or alternatively, in this or other embodiments one or more insulators are positioned radially between the probe body and the component wall.

In another exemplary embodiment, a method of installing an instrumentation probe to a component of a gas turbine engine includes installing a sensor assembly of the instrumentation probe through a component wall of the component, securing a threaded fastener to a complimentary thread of the sensor assembly to retain the sensor body at the component wall, and deforming a threaded interface between the threaded fastener and the sensor assembly to prevent rotation of the threaded fastener relative to the sensor assembly.

Additionally or alternatively, in this or other embodiments the deformation is achieved via application of a vibra-stake tool to the threaded interface.

Additionally or alternatively, in this or other embodiments a housing is installed to at least partially enclose the threaded interface.

Additionally or alternatively, in this or other embodiments a cover is installed onto the housing after deformation of the threaded interface.

Additionally or alternatively, in this or other embodiments a probe lead operably connected to the sensor assembly is routed through a lead opening in the housing.

Additionally or alternatively, in this or other embodiments the threaded fastener is a nut.

Additionally or alternatively, in this or other embodiments the threaded interface is deformed at one or more circumferential locations about the threaded interface.

In yet another exemplary embodiment, a stator assembly of a gas turbine engine includes a stator having one or more stator vanes, and an instrumentation probe installed to the stator. The instrumentation probe includes a sensor assembly extending through a stator wall of the stator, and a threaded fastener installed onto a complimentary thread of the sensor assembly to retain the sensor assembly at the stator. The threaded fastener is retained to the sensor assembly via deforming a threaded interface between the threaded fastener and the sensor assembly.

Additionally or alternatively, in this or other embodiments the deformation is formed via application of a vibra-stake tool to the threaded interface.

Additionally or alternatively, in this or other embodiments the threaded fastener is a nut.

Additionally or alternatively, in this or other embodiments a probe housing at least partially encloses the sensor assembly and the threaded fastener.

Additionally or alternatively, in this or other embodiments a probe lead is operably connected to the sensor body and extends through a lead opening in the probe housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
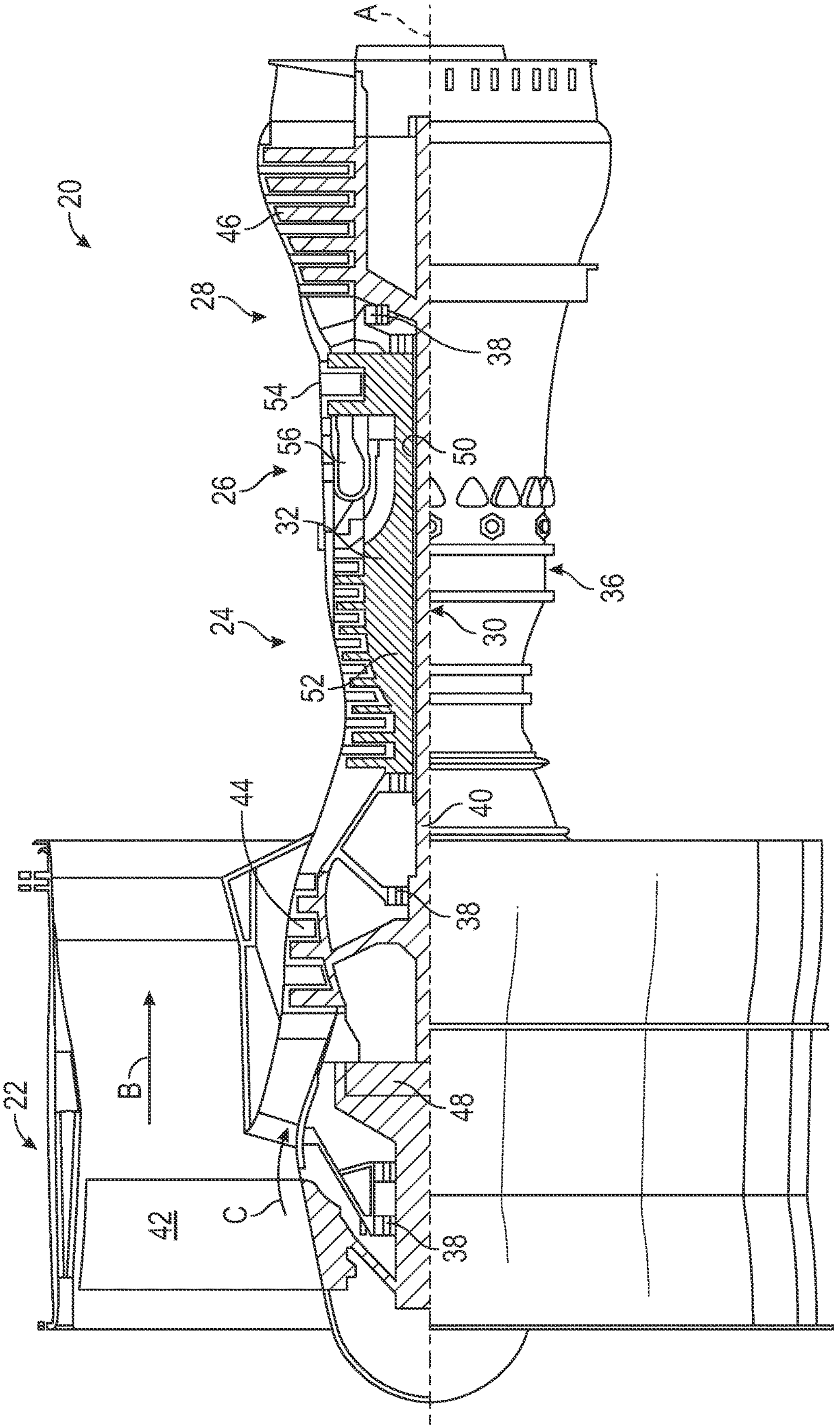
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ ^\circ \text{R})/(518.7^\circ \text{R})]^{0.5}$. The "Low corrected fan tip speed" as disclosed herein according to one non-limiting embodiment is less than about 1150 ft/second (350.5 m/sec).

Figure 2:
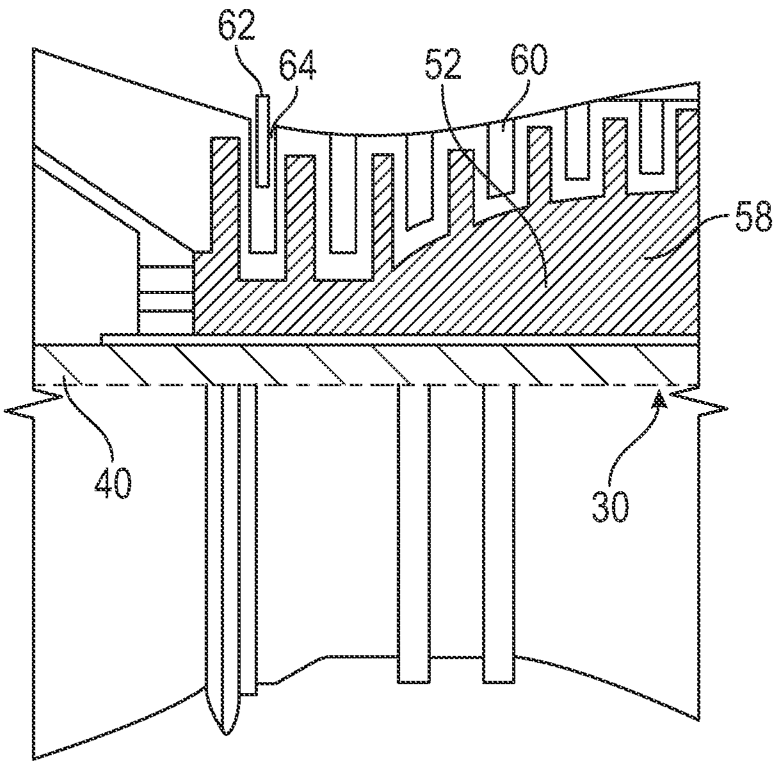
FIG. 2 is a partial cross-sectional view of a high pressure compressor of a gas turbine engine.

Referring now to FIG. 2, illustrated is an embodiment of a high pressure compressor 52. The high pressure compressor 52 includes one or more high pressure compressor (HPC) rotors 58 configured to rotate about the engine central longitudinal axis A, and one or more rotationally fixed HPC stators 60 located between axially adjacent HPC rotors 58. One or more instrumentation probes 62 are installed at the HPC stators 60 and may measure, for example, one or more of temperature, pressure or clearance. The instrumentation probes 62 extend through a probe opening 64 in the HPC stators 60. While the present disclosure is in the context of instrumentation probes 62 installed to the HPC stators 60, one skilled in the art will readily appreciate that the present disclosure is applicable to other components and locations of the gas turbine engine 20.

Figure 3:
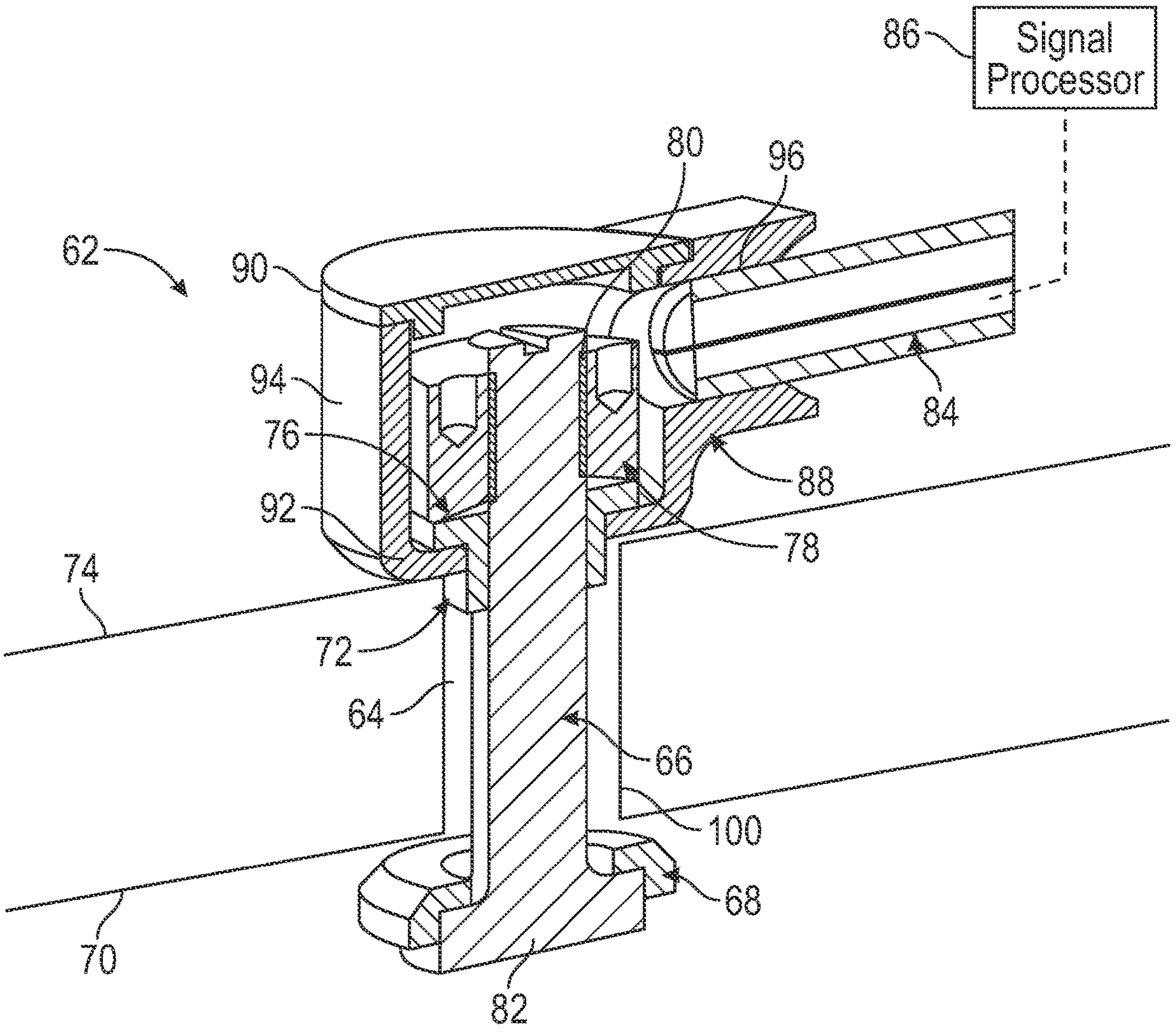
FIG. 3 is a partial illustration of an instrumentation probe installed to a component of a gas turbine engine.

Referring now to FIG. 3, an embodiment of an instrumentation probe 62 includes a sensor body 66 extending through the probe opening 64, with a lower insulator 68 positioned between the sensor body 66 and a stator wall 100 at an inner stator surface 70, and similarly has an upper insulator 72 positioned between the sensor body 66 and the stator wall 100 at an outer stator surface 74. A spacer 76 is placed on the sensor body 66 atop the upper insulator 72 and the sensor body 66 is secured in place in the probe opening 64 via a nut 78 installed to a threaded end 80 of the sensor body 66, which results in a clamping force being applied between the nut 78 and a sensor head 82 of the sensor body 66 on the stator 60. A signal lead, such as a wire 84 is connected to the sensor body 66 at or near the threaded end 80 to transmit signals obtained at the sensor head 82 away from the instrumentation probe 62 toward, for example, a signal processor 86. To protect the connection of the wire 84 to the sensor body 66, a housing 88 is installed over the threaded end 80. In some embodiments, the housing 88 is generally tubular having a first housing end 90 and a second housing end 92 and a sidewall 94 extending between the first housing end 90 and the second housing end 92. In some embodiments, the wire 84 extends through a wire opening 96 in the sidewall 94. A removable cover 96 is installed to the housing 88 at the first housing end 90.

Figure 4:
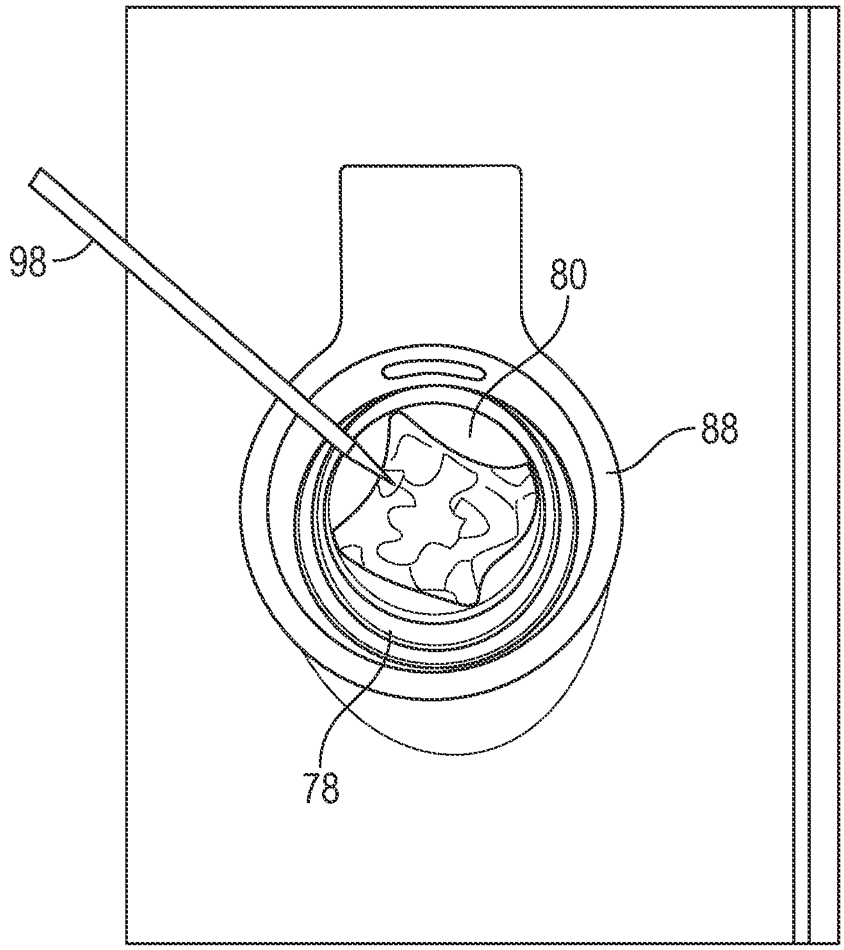
FIG. 4 is a schematic illustration of deformation of a threaded interface of an instrumentation probe installed to a component of a gas turbine engine.

It is desired to ensure that the clamping force is maintained on the stator 60 so that the position of the sensor body 66 is maintained during assembly and operation of the gas turbine engine 20. To accomplish this, the position of the nut 78 relative to the threaded end 80 is maintained by locking the relative position via a vibra-stake operation applied across the interface between the threaded end 80 and the nut 78 at one or more circumferential locations, for example, four circumferential locations as illustrated in FIG. 4. The vibra-stake operation utilizes, for example, a vibra-stake tool or other engraving tool, shown schematically at 98, with a carbide tip to deform the interface between the threaded end 80 and the nut 78, in particular deforming the threads of the threaded end 80 and the nut 78. The deformation prevents rotation of the nut 78 relative to the threaded end 80 thus preventing loosening of the retention of the sensor body 66 in the stator 60. Use of the vibra-stake tool 98 to deform the interface allows for retention of the sensor body 66 greatly increases the break torque of the interface, without imparting a high level of force on the probe 62 components thus preventing damage to delicate probe 62 components, such as the lower insulator 68 and the upper insulator 72.

Figure 5:
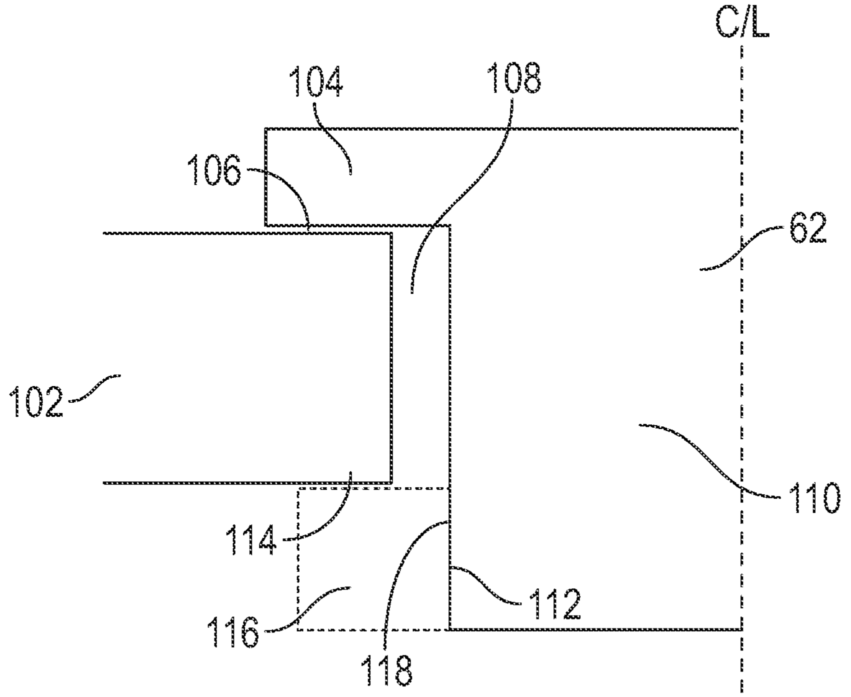
FIG. 5 is a partial cross-sectional view of another embodiment of an instrumentation probe installed to a component of a gas turbine engine.
Figure 6:
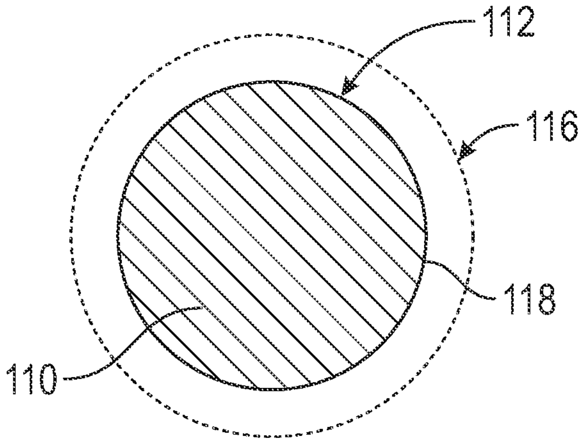
FIG. 6 is a face view of the embodiment of FIG. 5.

Another embodiment of instrumentation probe 62 is illustrated in FIGS. 5 and 6. The instrumentation probe 62 is installed directly to a component of the gas turbine engine 20, such as a case 102. The instrumentation probe 62 includes a probe head 104 disposed at a first side 106 of a case opening 108 in the case 102, and a probe body 110 that extends through the case opening 108. The probe body 110 includes a threaded end 112 that, when the instrumentation probe 62 is installed through the case opening 108, is disposed at a second side 114 of the case opening 108 opposite the first side 106. An installation collar 116 including internal threads 118 is installed onto the external threads of the threaded end 112 to retain the instrumentation probe 62 in the case opening 108. To maintain the position of the installation collar 116 relative to the threaded end 112, the threaded interface is deformed via the vibra-stake tool 98.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component assembly of a gas turbine engine, comprising:
a component of a gas turbine engine; and
an instrumentation probe installed to the component, the instrumentation probe including:
a sensor body extending through a component wall of the component;
a threaded fastener installed onto a complimentary thread of the sensor body to retain the sensor body at the component;
wherein the threaded fastener is retained to the sensor body via deforming a threaded interface between the threaded fastener and the sensor body;
wherein both one or more threaded of the threaded fastener and one or more threads of a threaded end of the sensor body are deformed to retain the threaded fastener to the sensor body.

2. The component assembly of claim 1, wherein the deformation is formed via application of an engraving tool to the threaded interface.

3. The component assembly of claim 1, wherein the threaded fastener is a nut.

4. The component assembly of claim 1, further comprising a probe housing at least partially enclosing the sensor body and the threaded fastener.

5. The component assembly of claim 4, further comprising a probe lead operably connected to the sensor body and extending through a lead opening in the probe housing.

6. The component assembly of claim 1 wherein the deformation is at one or more circumferential locations of the threaded interface.

7. The component assembly of claim 1, further comprising one or more insulators disposed radially between the probe body and the component wall.

8. A method of installing an instrumentation probe to a component of a gas turbine engine, comprising:
installing a sensor assembly of the instrumentation probe through a component wall of the component;
securing a threaded fastener to a complimentary thread of the sensor assembly to retain the sensor body at the component wall; and
deforming a threaded interface between the threaded fastener and the sensor assembly to prevent rotation of the threaded fastener relative to the sensor assembly;
wherein both one or more threaded of the threaded fastener and one or more threads of a threaded end of the sensor assembly are deformed to retain the threaded fastener to the sensor bassembly.

9. The method of claim 8, wherein the deformation is achieved via application of an engraving tool to the threaded interface.

10. The method of claim 8, further comprising installing a housing to at least partially enclose the threaded interface.

11. The method of claim 10, further comprising installing a cover onto the housing after deformation of the threaded interface.

12. The method of claim 10, further comprising routing a probe lead operably connected to the sensor assembly through a lead opening in the housing.

13. The method of claim 8, wherein the threaded fastener is a nut.

14. The method of claim 8, wherein the threaded interface is deformed at one or more circumferential locations about the threaded interface.

15. A stator assembly of a gas turbine engine, comprising:

a stator having one or more stator vanes; and an instrumentation probe installed to the stator, the instrumentation probe including:

a sensor assembly extending through a stator wall of the stator;

a threaded fastener installed onto a complimentary thread of the sensor assembly to retain the sensor assembly at the stator;

wherein the threaded fastener is retained to the sensor assembly via deforming a threaded interface between the threaded fastener and the sensor assembly;

wherein both one or more threaded of the threaded fastener and one or more threads of a threaded end of the sensor assembly are deformed to retain the threaded fastener to the sensor assembly.

16. The stator assembly of claim 15, wherein the deformation is formed via application of an engraving tool to the threaded interface.

17. The stator assembly of claim 15, wherein the threaded fastener is a nut.

18. The stator assembly of claim 15, further comprising a probe housing at least partially enclosing the sensor assembly and the threaded fastener.

19. The stator assembly of claim 18, further comprising a probe lead operably connected to the sensor body and extending through a lead opening in the probe housing.

* * * * *